US010130052B2

(12) United States Patent
Muff (10) Patent No.: US 10,130,052 B2
(45) Date of Patent: *Nov. 20, 2018

(54) LIQUID DISPENSING SYSTEM

(71) Applicant: 360 Yield Center, LLC, Morton, IL (US)

(72) Inventor: Dan Muff, Garner, IA (US)

(73) Assignee: 360 Yield Center, LLC, Morton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,136

(22) Filed: Oct. 20, 2015

(65) Prior Publication Data

US 2016/0037714 A1 Feb. 11, 2016

Related U.S. Application Data

(63) Continuation of application No. 13/136,961, filed on Aug. 16, 2011, now Pat. No. 9,167,745.

(51) Int. Cl.
| | |
|---|---|
| *B05B 1/20* | (2006.01) |
| *A01G 25/02* | (2006.01) |
| *A01M 7/00* | (2006.01) |
| *A01G 25/09* | (2006.01) |
| *A01C 23/02* | (2006.01) |
| *A01C 23/04* | (2006.01) |

(52) U.S. Cl.
CPC ............ *A01G 25/02* (2013.01); *A01C 23/028* (2013.01); *A01C 23/047* (2013.01); *A01G 25/09* (2013.01); *A01M 7/006* (2013.01)

(58) Field of Classification Search
CPC ..... A01C 23/02; A01C 23/028; A01C 23/047; A01M 7/006; A01M 7/0064; A01M 7/005; B05B 1/20; A01G 25/09

USPC ........ 239/146, 159, 163, 164, 169, 726, 734
See application file for complete search history.

(56) References Cited

U.S. PATENT DOCUMENTS

| | | | |
|---|---|---|---|
| 1,348,038 A | 7/1920 | Neumeyer |
| 2,301,213 A | 11/1942 | Kang |
| 2,692,799 A | 10/1954 | Parrot |
| 3,117,725 A | 1/1964 | Palmer |
| 3,147,568 A | 9/1964 | Inhofer |
| 3,235,187 A | 2/1966 | Merritt |

(Continued)

FOREIGN PATENT DOCUMENTS

| | | |
|---|---|---|
| WO | WO8701909 | 4/1987 |
| WO | WO8801539 | 3/1988 |

*Primary Examiner* — Jason Boeckmann
(74) *Attorney, Agent, or Firm* — Thomas J. Oppold; Larkin Hoffman Daly & Lindgren, Ltd.

(57) ABSTRACT

A liquid dispensing system that includes a carrier having a storage tank disposed thereon for storing a liquid product. A boom is coupled to the carrier and includes a distribution hose through which the liquid product flows from the storage tank and into a number of liquid placement apparatuses. Each liquid placement apparatus includes a drop assembly coupled to the boom and extending downward. A base assembly is coupled to the lower end of the drop assembly and a hose assembly extends from the distribution hose to the base assembly. A lower hose assembly is protected within the base assembly and includes a pair of dribble hoses extruding from the base assembly. The liquid product is delivered proximate to the ground surface through the dribble hoses.

12 Claims, 11 Drawing Sheets

(56) References Cited

U.S. PATENT DOCUMENTS

| | | | |
|---|---|---|---|
| 3,478,967 A | | 11/1969 | Horton et al. |
| 3,515,349 A | | 6/1970 | Mecklin et al. |
| 4,382,555 A | * | 5/1983 | Ucinhazska .......... A01M 7/005 |
| | | | 239/734 |
| 4,521,988 A | | 6/1985 | Thacker |
| 4,583,319 A | | 4/1986 | Wolff et al. |
| 4,736,888 A | | 4/1988 | Fasnacht |
| 4,795,100 A | | 1/1989 | Purtell |
| 4,842,195 A | | 6/1989 | Koll et al. |
| 4,970,973 A | | 11/1990 | Lyle et al. |
| 5,516,044 A | | 5/1996 | Thorntensson |
| 5,586,728 A | | 12/1996 | McKenry |
| 5,996,904 A | | 12/1999 | Smeraldi |
| 6,343,749 B1 | * | 2/2002 | Thom .................. A01G 25/092 |
| | | | 239/1 |
| 7,077,070 B1 | | 7/2006 | Williams |
| 9,167,745 B2 | * | 10/2015 | Muff .................... A01C 23/028 |
| 2004/0158381 A1 | | 8/2004 | Strelioff et al. |
| 2005/0211802 A1 | * | 9/2005 | Newton ................ F16L 41/03 |
| | | | 239/548 |
| 2008/0191055 A1 | | 8/2008 | Ellsworth |
| 2013/0026261 A1 | | 1/2013 | Korus |
| 2013/0037625 A1 | | 2/2013 | Arenson et al. |
| 2013/0043326 A1 | | 2/2013 | Muff |

* cited by examiner

LIQUID DISPENSING SYSTEM

BACKGROUND

In modern farming practices, broadcast applications of fertilizers or other liquid products to assist plant growth are common practice. For example, applying starter fertilizers at planting in furrow or subsurface presents an opportunity to assist plant nutrient needs for a short period of time, and in very limited amounts. Moreover, world goals of an average corn yield of 300 bushels per acre and average soybean yields of 100 bushels per acre have been suggested to help support the ever-growing population's food and energy needs. Agronomic specialists are developing new genetics in grains, creating genetic potential to achieve these higher yield goals. However, conventional liquid product application systems are useful only at the beginning of the plant's life and, especially when used later in a plant's life, create a significant amount of waste as they spray liquid products in the air above the plants. Thus, conventional broadcast applications of liquid products do not allow for the level of fertilization needed for new genetic plant nutrient needs.

SUMMARY

This summary is provided to introduce a selection of concepts in a simplified form that are further described below in the Detailed Description. This summary is not intended to identify key features or essential features of the claimed subject matter, nor is it intended to be used, in isolation, as an aid in determining the scope of the claimed subject matter. At a high level, embodiments of the invention relate to a liquid dispensing system that can be used, for example, to dispense liquid products to the ground surface.

Embodiments of the invention facilitate applying liquid fertilizers, or other liquid products, within approximately 3" of a plant row and at virtually any time in a row crop plant life. Embodiments of the invention facilitate distributing liquid products close to the crop row, thereby ensuring that the placement of the liquid product is close enough to the crop rows so that the product can take advantage of runoff moisture created in the evenings in the form of dews. In the early morning hours of the day, the water from a dew tends to follow the plant downward to the base of the plant, where it is disbursed into the soil in an area of approximately 3" to 5" to each side of the plant. This distribution of water assists the soil, through the process of mass flow or diffusion, in moving mineralized plant nutrients to the plant. Embodiments of the invention allow for the product to enter the soil profile and to be mineralized by soil life, making the product available to the plant during photosynthesis. In the process of photosynthesis, the plant can receive the product along with water from the soil profile, or surface water, if the plant desires to receive the product, into the plant and utilize the product for plant functions.

Embodiments of the invention facilitate placing plant food in an area close to plant roots for attraction, which will enable plants to environmentally utilize less nutrients, thereby reducing the volume of nutrients needed to produce fruit lessening the environmental footprint from over-fertilization of products. Additionally, the option of feeding plants properly, based on the plant nutrient needs per plant stage, creates efficiency and increases the plants' ability to produce more fruit.

A first illustrative embodiment of the present invention relates to an apparatus that facilitates delivery of a liquid product from a storage tank disposed on a carrier to a ground surface. A drop assembly is coupled, at a first end, to a boom attached to the carrier. The drop assembly extends downward from the drop-location on the boom and is coupled, at a second end, to a base assembly. The illustrative embodiment further includes a hose assembly that is coupled to the drop assembly and that facilitates transporting the liquid product from the distribution hose to the ground.

A second illustrative embodiment of the present invention relates to a liquid dispensing system. The liquid dispensing system includes a carrier having a tank that stores a liquid product. The liquid dispensing system also includes a boom, coupled to the carrier, having plumbing into which the liquid product is pumped from the tank and a liquid placement apparatus coupled, at a drop-location, to the boom. According to embodiments, the liquid placement apparatus includes a drop assembly coupled, at a first end, to the boom, and extending downward from the drop-location to a base assembly. In embodiments, the liquid placement apparatus also includes a hose assembly that is coupled to the drop assembly. The hose assembly facilitates transporting the liquid product from the distribution hose to the ground.

A third illustrative aspect of the invention relates to an apparatus that facilitates delivery of a liquid chemical from a storage tank disposed on a carrier to a ground surface. In embodiments, the carrier includes a boom having a distribution hose disposed thereon. The illustrative apparatus includes a drop assembly coupled, at a first end, to the boom, and extending downward from a drop-location on the boom. In embodiments, the apparatus also includes a coupling assembly that couples the drop assembly to the boom at the drop location; a base assembly that is coupled to a second end of the drop assembly; and a hose assembly that is coupled to the drop assembly. In embodiments, the hose assembly includes an upper hose assembly that is coupled, at an upper end, to an outlet on the boom; a y-splitter that is coupled to a lower end of the upper hose assembly; and a lower hose assembly that is coupled to the y-splitter.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies.

Embodiments of the invention allow for efficiencies in fertilizer usage and higher yield potential by creating the ability to feed plants just prior to the plants' specific crop nutrient needs, thereby helping the genetics to reach their full potential. Embodiments of the invention include a liquid placement apparatus that places the nutrients near the rhizosphere in a moisture zone for the process of mineralization. Nutrients can either be taken in by the plants by mass flow or diffusion, thereby minimizing the environmental footprint left during fertilizer application. By implementing embodiments of the invention, an early time line of opportunity of application is achieved and ranges from the early vegetative stages of a plant's life to the middle reproductive stages of the plant's life. This range creates a large window of opportunity for applicators to achieve new levels of fertilization for higher yields and to achieve more efficient use of fertilizer, thereby reducing surface contamination.

Figure 1:
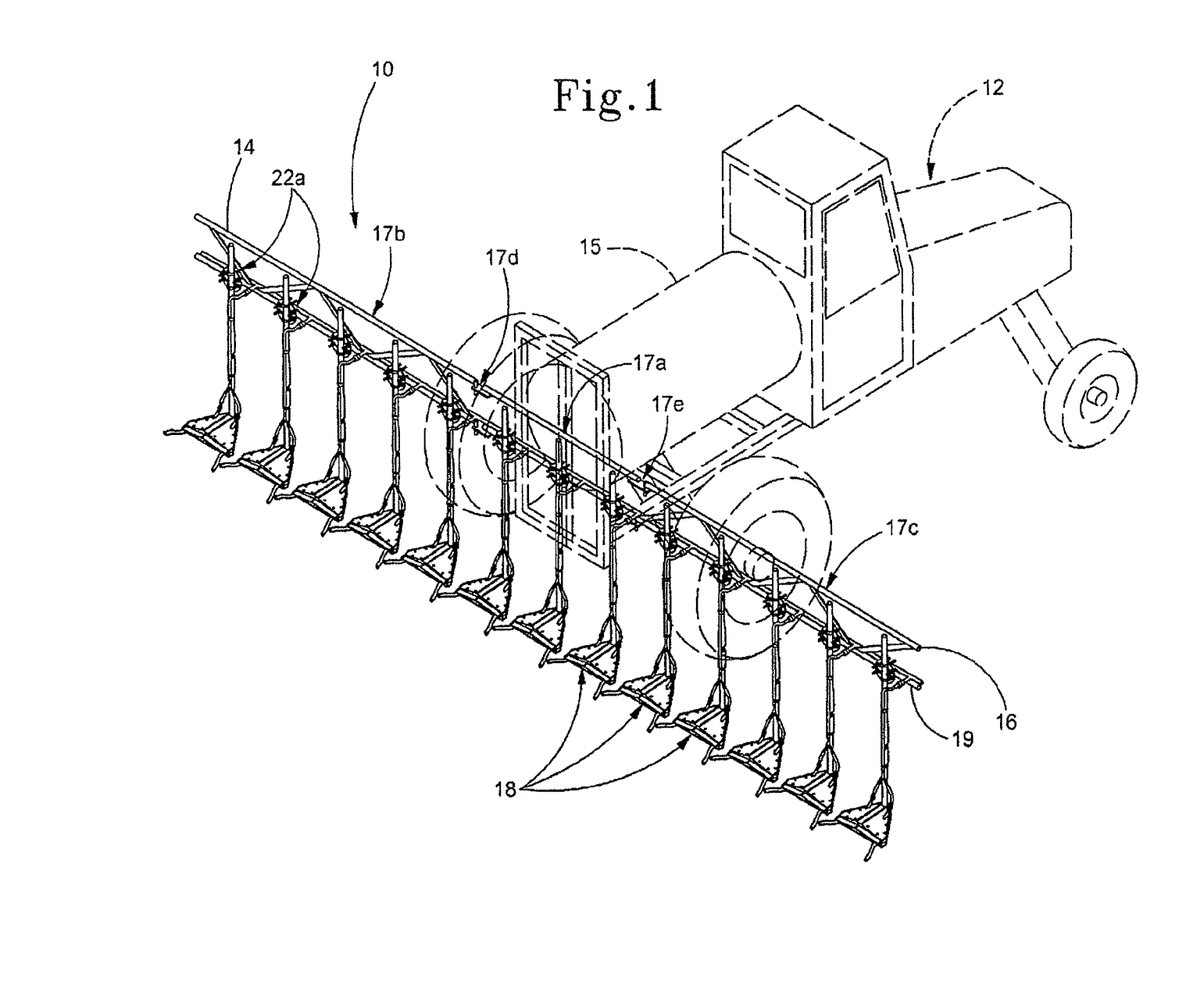
FIG. 1 is a perspective view of an illustrative liquid dispensing system in accordance with embodiments of the invention.

Turning to FIG. 1, an illustrative liquid dispensing system 10 is depicted in a perspective view. As shown in FIG. 1, the illustrative liquid dispensing system 10 includes a carrier 12 that supports a liquid dispensing apparatus 14. According to various embodiments, the carrier 12 can be of any number of different configurations. For example, in some embodiments and as illustrated in FIG. 1, the carrier 12 can be a tractor that includes its own propulsion technology and to which the liquid dispensing apparatus 14 is directly coupled. In other embodiments, the carrier 12 can be a trailer, or other towable vehicle, to which the liquid dispensing apparatus 14 is attached. In these embodiments, the carrier 12 can be towed by an independent tractor. Any number of different configurations for the carrier 12 are possible and all of these are considered to be within the ambit of the invention.

As shown in FIG. 1, the liquid dispensing apparatus 14 includes a boom 16 (often referred to as a "toolbar"). A number of liquid placement apparatuses 18 are coupled to the boom 16 and extend downward therefrom (e.g., when the boom 16 is in a fully extended position). Each of the liquid placement apparatuses 18 receives a liquid product from a tank 15 that is supported by the carrier 12. The liquid product is transferred from the tank 15 to a liquid placement apparatus 18 via one or more distribution hoses 19 that are disposed along the boom 16. Any type and number of suitable distribution hoses 19 can be utilized and any type of suitable pumping mechanism (not illustrated for the purposes of brevity and clarity of description) can be employed to transfer the liquid product from the tank 15 to the distribution hoses 19, and thereby, to the liquid placement apparatuses 18.

According to various embodiments, the boom 16 can be of any number of different lengths and of any number of different configurations. For example, common boom 16 lengths include 60 feet, 90 feet, and 100 feet. Any other boom 16 length could be employed, as well, in accordance with embodiments of the invention. The boom 16 is attached to the carrier 12 using any number of attachment technologies including, for example, a z-bracket mechanism. In embodiments, the boom 16 can be attached in front of the carrier 12 or behind the carrier 12. According to various embodiments of the invention, the carrier 12 includes the ability to raise the boom 16 to a height that is high enough to allow the carrier 12 to turn on the end of a field in a standing crop without injuring the standing crop. In other embodiments, portions of the boom 16 can be folded upwardly, and out of the way of the standing crops, as described below.

As illustrated in FIG. 1, the boom 16 includes a center section 17a, that is mounted to the carrier 12, and two wing sections 17b and 17c. In some embodiments, the wing sections 17b and 17c can be designed to fold at joints 17d and 17e, respectively. The foldable design allows for space-efficient storing of the system 10. Additionally, the wing sections 17b and 17c can be optionally folded (e.g., upwardly) during a turn-around action at the end of a crop row. It will be understood by individuals having skill in the relevant arts that foldable wings sections 17b and 17c can be useful in that, when the carrier 12 reaches an end of a crop row, the wing sections 17b and 17c can be folded upwardly, thereby moving the wing sections 17b and 17c, and any hardware attached thereto, out of the way of the crops at the end of the crop row as the carrier 12 is turned around to go down an adjacent crop row in the opposite direction.

Figures 2A, 2B:
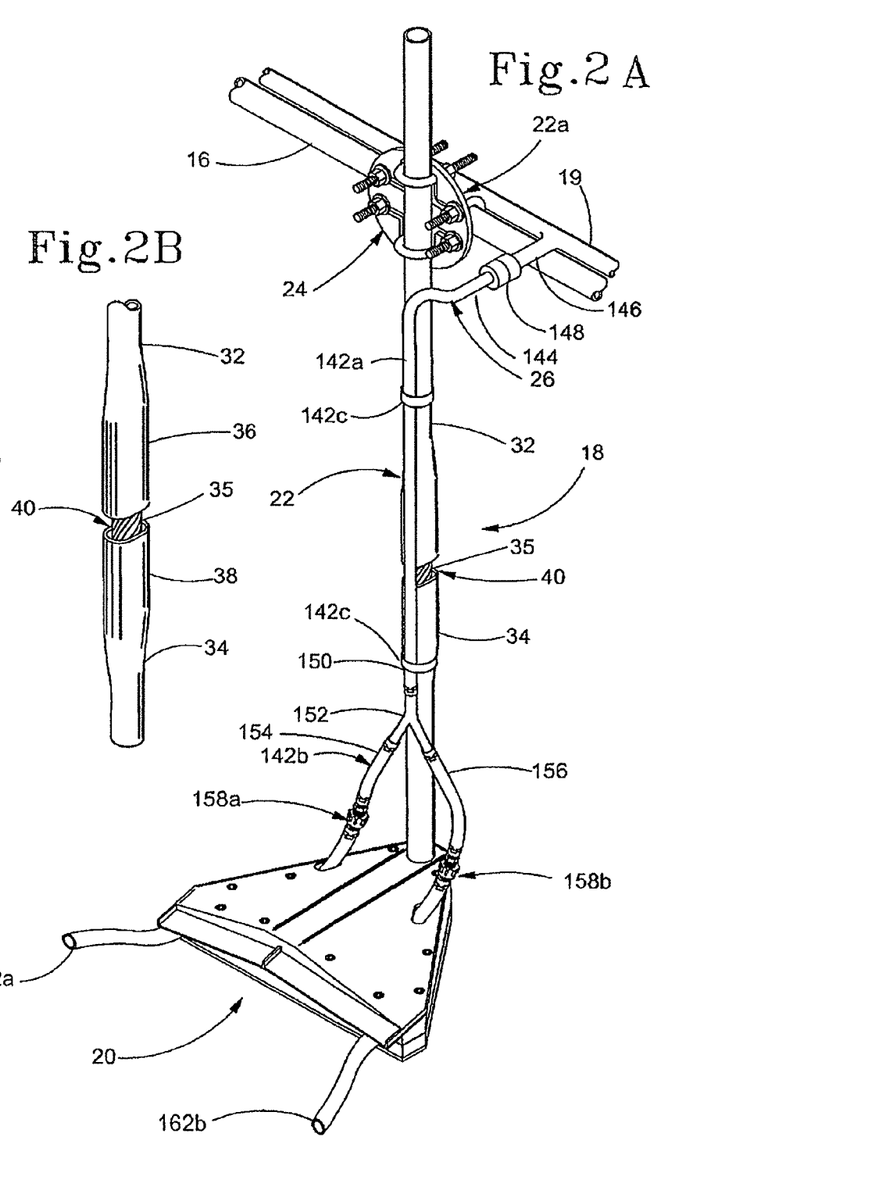
FIG. 2A is a perspective view of an illustrative liquid placement apparatus in accordance with embodiments of the invention.
FIG. 2B depicts a partial view of an illustrative drop assembly in accordance with embodiments of the invention.
Figure 2C:
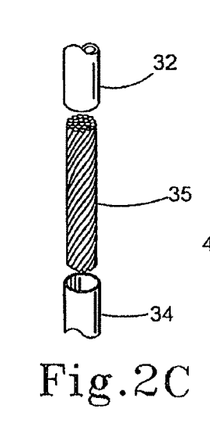
FIG. 2C is a partial, exploded view of the illustrative drop assembly in accordance with embodiments of the invention.

Turning now to FIG. 2A, an illustrative liquid placement apparatus 18 is depicted in a perspective view. As shown, the liquid placement apparatus includes a base assembly 20 that is coupled to a lower end of a drop assembly 22. The drop assembly 22 is adjustably coupled to the boom 16 using a coupling assembly 24. The liquid placement apparatus 18 further includes a hose assembly 26 that facilitates transferring liquid product from the distribution hose 19 associated with the boom 16 to the base assembly 20, which includes two dribble hoses 162a and 162b extending therefrom through which the liquid product is delivered to the ground.

As shown in FIGS. 2A-2C, 3A, and 3B, the drop assembly 22 includes an upper portion 32 and a lower portion 34, flexibly coupled together using a cable 35 that is disposed within the upper portion 32 and the lower portion 34. In embodiments, the cable 35 can be secured to the inside of each of the upper portion 32 and the lower portion 34 of the drop assembly 22 by crimping the cable 35 in place at crimps 36 and 38, respectively. In other embodiments, any number of other mechanisms can be used to couple the cable 35 to the upper 32 and lower 34 portions of the drop assembly 22. Additionally, as illustrated in FIGS. 2A-2C, 3A, and 3B, the drop assembly 22 includes a gap 40 between the upper portion 32 and the lower portion 34 of the drop assembly 22. The gap 40 allows the lower portion 34 of the drop assembly 22 to move relative to the upper portion 32 such as, for example, when an obstacle is encountered. According to various embodiments of the invention, the gap 40 can be of any desired size (e.g., ½", ¾", 1", etc.).

Figures 3A, 3B:
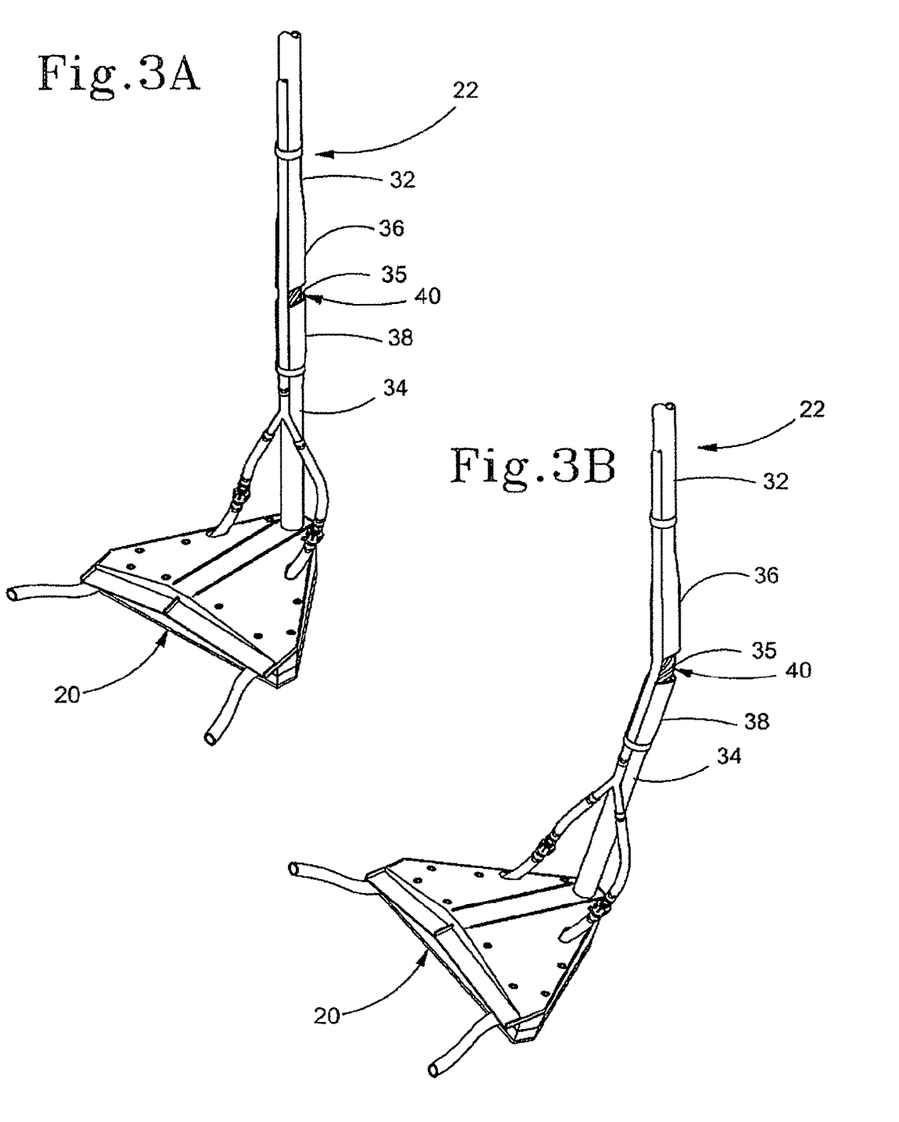
FIG. 3A is a perspective view of an illustrative drop assembly, shown in a first position, in accordance with embodiments of the invention.
FIG. 3B is a perspective view of the illustrative drop assembly of FIG. 3A, shown in a second position, in accordance with embodiments of the invention.

Turning to FIGS. 3A and 3B, an illustrative drop assembly 22 is depicted in two perspective views, in two different positions, according to embodiments of the invention. In a first position, illustrated in FIG. 3A, the drop assembly 22 is oriented substantially vertically and the upper 32 and lower 34 portions of the drop assembly 22 are substantially aligned, providing a roughly straight drop assembly 22. The cable 35 extends across the gap 40, thereby providing a flex point at which the lower portion 34 of the drop assembly 22 can move (e.g., flex, tilt, etc.) into a second position, illustrated in FIG. 3B, when the lower portion 34 of the drop assembly 22 or the base assembly 20 encounters a foreign structure such as, for example, a standing crop or field obstructions such as rocks, posts, gulleys or ravines.

The upper portion 32 and the lower portion 34 of the drop assembly 22 can be of any number of different lengths and configurations. In an embodiment, for example, the upper 32 and lower 34 portions together make a drop assembly 22 that is 18" to 30" long. Depending upon the particular application, the drop assembly 22 can be shorter than 18" and, in some embodiments, the drop assembly can be longer than 30." In some embodiments, the upper 32 and lower 34 portions of the drop assembly 22 can include ¾" pipe flexibly coupled to one another using a ⅝ cable 35 that is crimped inside of the upper 32 and lower 34 portions. In some embodiments, the upper portion 32 and the lower portion 34 can be flexibly coupled to one another using any number of other coupling mechanisms including, for example, hinges, pivots, rotational coupling mechanisms, and the like, such that the lower portion 34 of the drop assembly 22 can move relative to the upper portion 32 when the lower portion 34 encounters an obstacle such as, for example, a standing crop, as shown in FIG. 3B.

Returning now to FIG. 2, the drop assembly 22 is adjustably coupled to the boom 16 using a coupling assembly 24 that couples the upper portion 32 of the drop assembly 22 to the boom 16 at a drop location 22a. According to various embodiments, any number of drop assemblies 22 can be coupled to the boom 16, with any desired amount of spacing provided between adjacent drop assemblies 22. According to embodiments, the boom 16 includes a number of drop assemblies 22 extending downwardly therefrom, where each drop assembly 22 extends downwardly from the boom 16 at a drop location 22a. In some embodiments, for example, the boom 16 includes a drop location 22a at every 15"-48", depending upon the configuration of the boom 16.

Figures 4A, 4B:
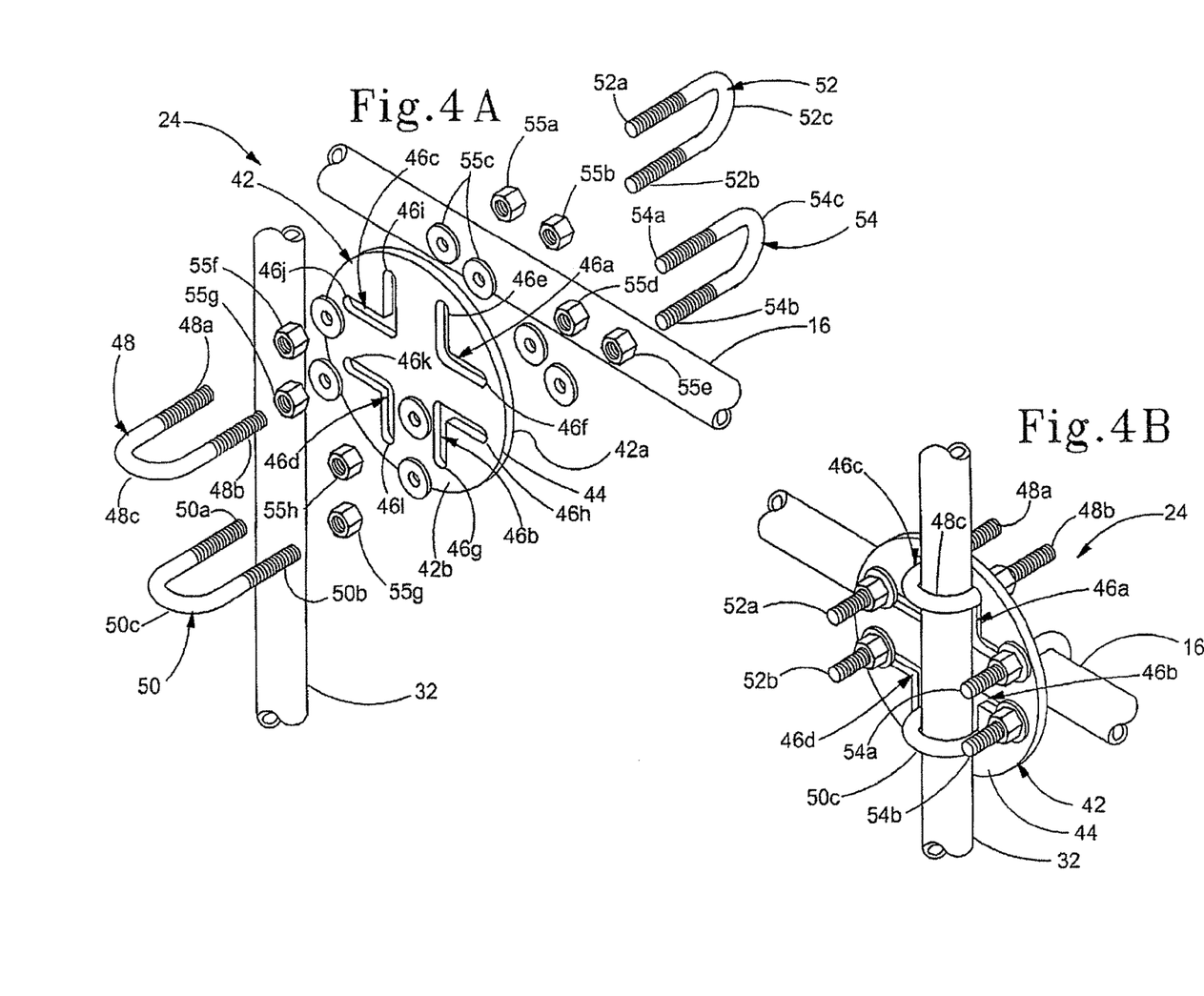
FIG. 4A is an exploded, perspective view of an illustrative coupling assembly in accordance with embodiments of the invention.
FIG. 4B is an assembled, perspective view of the illustrative coupling assembly of FIG. 4A in accordance with embodiments of the invention.

Turning now to FIGS. 4A and 4B, an illustrative coupling assembly 24 is illustrated in an exploded view (FIG. 4A) and in an assembled view (FIG. 4B). The illustrative coupling assembly 24 is just one example of a suitable coupling assembly in accordance with embodiments of the invention. In embodiments, other types of coupling assemblies can be used and in some embodiments, the coupling assembly 24 can include features or configurations not described herein. The illustrative coupling assembly 24, illustrated in FIGS. 4A and 4B allows for adjusting the placement of the coupling assembly (and therefore, the drop assembly 22) along the boom 16 (e.g., the coupling assembly 24 allows for determining a drop location 22a with minimal effort).

As shown in FIGS. 4A and 4B, the illustrative coupling assembly 24 includes a bracket 42, having a number of slots 46a, 46b, 46c, and 46d disposed therein, and U-bolts 48, 50, 52, and 54 that are configured to be coupled to the bracket 42, and around the boom 16 and the upper portion 32 of the drop assembly 22, thereby removably attaching the drop assembly 22 to the boom 16. With particular reference to FIG. 4A, the bracket 42 includes a body 44, in which is disposed the slots 46a, 46b, 46c, and 46d, which, in some embodiments, are generally L-shaped, as shown in FIGS. 4A and 4B. According to various embodiments, the body 44 of the bracket 42 is substantially flat and substantially circular in shape and is configured such that each L-shaped slot 46a, 46b, 46c, and 46d is roughly disposed within a quadrant of the circularly-shaped body 44, as shown in FIGS. 4A and 4B. In some embodiments, the body 44 can include any number of other types of shapes. Similarly, in embodiments, the slots 46 can include shapes other than L-shapes such as, for example, S-shapes, T-shapes, and the like. According to various embodiments, the slots 46a, 46b, 46c, and 46d are evenly spaced around the bracket 44 and can be particularly spaced apart to correspond to the widths of the upper portion 32 of the drop assembly 22 and the boom 16.

As is shown in FIGS. 4A and 4B, in operation, the upper portion 32 of the drop assembly 22 is aligned in a perpendicular orientation with the boom 16 and the bracket 42 is disposed between the upper portion 32 and the boom 16. As is illustrated in FIG. 4B, the bracket 42 is positioned such that a first pair of L-shaped slots 46a and 46b is exposed on a first side of the upper portion 32 of the drop assembly 22 and a second pair of L-shaped slots 46c and 46d is exposed on a second side of the upper portion 32 of the drop assembly 22.

In this mounting position, a first portion 46e of the first slot 46a is oriented substantially parallel to the upper portion 32 of the drop assembly 22 and connects with a second portion 46f, at a lower end of the first portion 46e. The second portion 46f of the first slot 46a extends from the lower end of the first portion 46e outwardly, in a direction that is substantially parallel to the boom 16. Similarly, but in what is essentially a reflected orientation, in the mounting position, the second slot 46b includes a first portion 46g that is substantially parallel to the upper portion 32 of the drop assembly 22 and connects with a second portion 46h, at an upper end of the first portion 46g. The second portion 46h of the second slot 46b extends from the upper end of the first portion 46g outwardly, in a direction that is substantially parallel to the boom 16. Also in the mounting position, a first portion 46i of the third slot 46c is oriented substantially parallel to the upper portion 32 of the drop assembly 22 and connects with a second portion 46*j*, at a lower end of the first portion 46*i*. The second portion 46*j* of the third slot 46*c* extends from the lower end of the first portion 46*i* outwardly, in a direction that is substantially parallel to the boom 16. Similarly, but in what is essentially a reflected orientation, in the mounting position, the fourth slot 46*d* includes a first portion 46*k* that is substantially parallel to the upper portion 32 of the drop assembly 22 and connects with a second portion 46*l*, at an upper end of the first portion 46*k*. The second portion 46*l* of the fourth slot 46*d* extends from the upper end of the first portion 46*k* outwardly, in a direction that is substantially parallel to the boom 16.

With particular reference to FIG. 4A, to adjustably secure the drop assembly 22 to the boom 16, a set of adjustable U-bolts 48, 50, 52, and 54 are utilized. Each U-bolt 48, 50, 52, and 54 is roughly shaped like a "U." That is, for example, a first U-bolt 48 includes a first arm 48*a* and a second arm 48*b* that are parallel to one another and that each have threads disposed toward the outside end of the arm 48*a* and 48*b*. A curved mid-portion 48*c* extends between the inside ends of the first arm 48*a* and the second arm 48*b*, thereby defining a U-shaped bolt 48. Similarly, a second U-bolt 50 includes threaded parallel arm portions 50*a* and 50*b* connected by a curved mid-portion 50*c*; a third U-bolt 52 includes threaded parallel arm portions 52*a* and 52*b* connected by a curved mid-portion 52*c*; and a fourth U-bolt 54 includes threaded parallel arm portions 54*a* and 54*b* connected by a curved mid-portion 54*c*.

As illustrated in FIG. 4B, to secure the bracket 42 to the upper portion 32 of the drop assembly 22 and the boom 16, the first U-bolt 48 is inserted through the back 42*b* of the bracket 42 such that the first arm member 48*a* passes through the first portion 46*i* of the third slot 46*d*, the second arm member 48*b* passes through the first portion 46*e* of the first slot 46*a*, and the mid-portion 48*c* of the first U-bolt 48 wraps around the outside (back) side of the upper portion 32 of the arm assembly 22. A first nut 55*a* is screwed onto the first arm member 48*a* and secured against the front side 42*a* of the bracket 42, and a second nut 55*b* is screwed onto the second arm member 48*b* of the first U-bolt 48 and secured against the front side 42*a* of the bracket 42, thereby holding the first U-bolt 48 in place. As shown, in embodiments one or more washers 55*c* can be disposed between the nuts 55*a* and 55*b* and the bracket 42.

Similarly, the second U-bolt 50 is inserted through the back 42*b* of the bracket 42 such that the first arm member 50*a* of the second U-bolt 50 passes through the first portion 46*k* of the fourth slot 46*d*, the second arm member 50*b* passes through the first portion 46*g* of the second slot 46*b*, and the mid-portion 50*c* of the second U-bolt 50 wraps around the outside (back) side of the upper portion 32 of the arm assembly 22. A third nut 55*d* is screwed onto the first arm member 50*a* and secured against the front side 42*a* of the bracket 42, and a fourth nut 55*e* is screwed onto the second arm member 50*b* of the second U-bolt 50 and secured against the front side 42*a* of the bracket 42, thereby holding the second U-bolt 50 in place.

As shown in FIG. 4B, the first and second U-bolts 48 and 50 adjustably couple the upper portion 32 of the drop assembly 22 to the back side 42*b* of the bracket 42. Similarly, the third and fourth U-bolts 52 and 54 adjustably couple the boom 16 to the front side 42*a* of the bracket 42, as described here. As shown in FIGS. 4A and 4B, the third U-bolt 52 is inserted through the front 42*a* of the bracket 42 such that the first arm member 52*a* of the third U-bolt 52 passes through the second portion 46*j* of the third slot 46*c*, the second arm member 52*b* passes through the second portion 46*l* of the fourth slot 46*d*, and the mid-portion 52*c* of the second U-bolt 52 wraps around the inside (front) side of the boom 16. A fifth nut 55*f* is screwed onto the first arm member 52*a* and secured against the back side 42*b* of the bracket 42, and a sixth nut 55*g* is screwed onto the second arm member 52*b* of the third U-bolt 52 and secured against the back side 42*b* of the bracket 42, thereby holding the third U-bolt 52 in place.

Similarly, the fourth U-bolt 54 is inserted through the back 42*b* of the bracket 42 such that the first arm member 54*a* of the fourth U-bolt 54 passes through the second portion 46*f* of the first slot 46*a*, the second arm member 54*b* passes through the second portion 46*h* of the second slot 46*b*, and the mid-portion 54*c* of the second U-bolt 54 wraps around the inside (front) side of the boom 16. A seventh nut 55*h* is screwed onto the first arm member 54*a* and secured against the back side 42*b* of the bracket 42, and an eighth nut 55*h* is screwed onto the second arm member 54*b* of the fourth U-bolt 54 and secured against the back side 42*b* of the bracket 42, thereby holding the fourth U-bolt 54 in place. In this manner, the upper portion 32 of the drop assembly 22 is adjustably and removably coupled to the boom 16.

Figure 5:
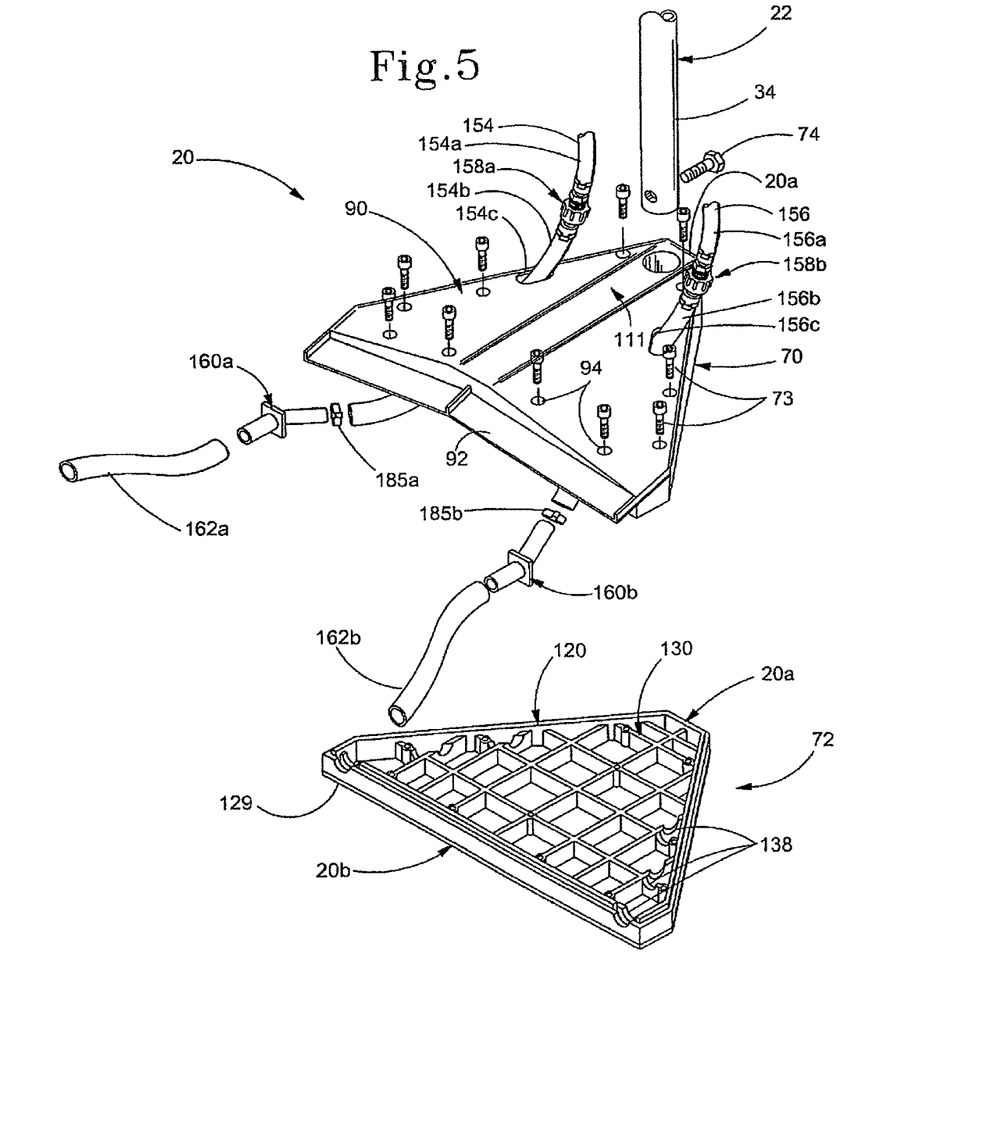
FIG. 5 is an exploded, perspective view of an illustrative base assembly in accordance with embodiments of the invention.

Turning now to FIG. 5, an illustrative base assembly 20 is depicted in an exploded, perspective view. According to various embodiments of the invention, the base assembly 20 is a roughly triangle-shaped unit. The front 20*a* of the base assembly 20 leads the assembly 20 through the terrain so that the base assembly 20 can push through crops and other obstacles. In embodiments, the base assembly 20 is constructed from polypropylene plastic and, in embodiments, incorporates a grid-based design that is engineered for strength, weight distribution and durability. According to various embodiments, the base assembly 20 travels between approximately 6" and approximately 8" above the ground surface as the carrier 12 (see FIG. 1) moves through the crop rows, but can still be effective as high as 28" above the ground surface. Each base assembly 20 travels independently through a crop row and that crop row acts as a guide for the base assembly 20 to follow in contours and uneven topography. Y-drop has the capacity to dribble on the surface 1 to 50 gallons of product within 3" on both sides of plant rows. According to embodiments, and with reference to FIG. 1, the liquid placement apparatuses 18 are mounted on the boom 16 with approximately 6" of space between each of the base assemblies 20. In other embodiments, the apparatuses 18 are configured to allow a different amount of space between base assemblies 20.

As shown in FIG. 5, the base assembly 20 is manufactured in two injected molded pieces: an upper portion 70 and a lower portion 72. The upper portion 70 and lower portion 72 of the base assembly 20 are coupled using fastening devices such as, for example, a number of screws 73. The base assembly 20 is coupled to the bottom of the lower portion 34 of the drop assembly 22 using a fastening device such as, for example, a 5/16*1.5" shoulder bolt 74. In other embodiments, other types or sizes of bolts or other fasteners can be used to attach the base assembly 20 to the drop assembly 22. In an embodiment, the bolt 74 is disposed approximately 1" from the bottom of the base assembly 20 and can be secured to the lower portion 34 of the drop assembly 22 using a nut (not illustrated).

With particular reference to FIGS. 5 and 7A-7C, the upper portion 70 of the base assembly includes a back wall 76 and a parallel, opposed front wall 78. Angled side walls 80 extend from the ends of the front wall 78 toward the ends of the back wall 76, which is longer than the front wall 78. In some embodiments, the back wall 76 is significantly longer than the front wall 78, thereby providing for a wider base angle 79. In an embodiment, the upper portion 70 of the base assembly 20 does not include a front wall 78, but rather, comes to a point in the front. A pair of parallel, opposed wall segments 82 extend between the back ends 84 of the side walls 80 and the ends 86 of the back wall 76, thereby forming a roughly triangular frame 88. An upper panel 90 is disposed over the frame 88. As is further illustrated in FIGS. 5 and 7A, a wing 92 is attached to the back wall 76 and extends outwardly from the back wall 76, along the length of the back wall 76. Additionally, a number of apertures 94 are disposed within the upper panel 90. The apertures 94 are adapted to receive the screws 73 with which the base assembly 20 is assembled.

Figures 7A, 7B, 7C:
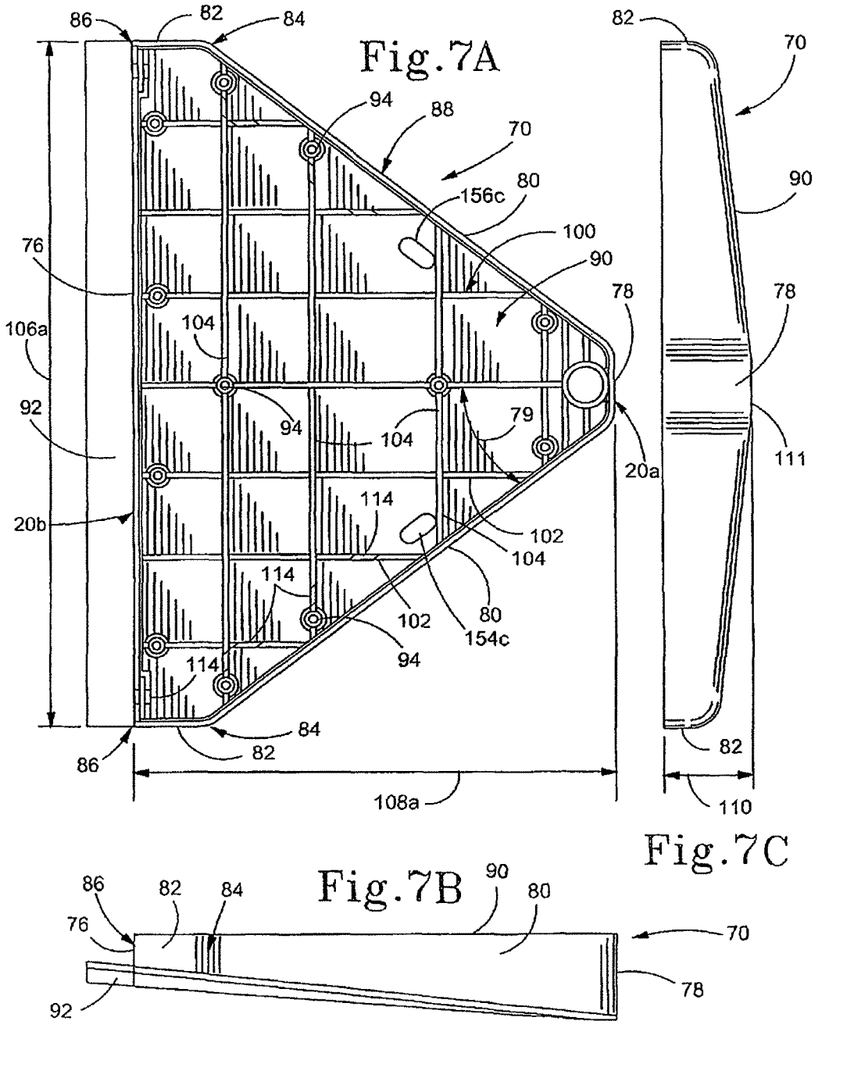
FIG. 7A is a bottom view of an illustrative upper portion of a base assembly in accordance with embodiments of the invention.
FIG. 7B is a side view of the illustrative upper portion of FIG. 7A in accordance with embodiments of the invention.
FIG. 7C is a front, outline view of the illustrative upper portion of FIGS. 7A and 7B in accordance with embodiments of the invention.

With particular reference to FIG. 7A, disposed within the frame 88 of the upper portion 70 of the base assembly 20 is an upper grid 100. In embodiments, the upper grid 100 includes a first set of ribs 102, which extend between the two sidewalls 80, parallel to the back wall 76. A second set of ribs 104 intersects the first set of ribs 102 and each of the second set of ribs 104 extends between the back wall 76 and a sidewall 80, in an orientation substantially perpendicular to the back wall 76 (and, thus, the first set of ribs 102), and in the configuration illustrated. As shown in FIG. 7A, the apertures 94 extend through ribs 102 or 104, thereby allowing the screws 73 to pass through the upper portion 70 of the base assembly 20 into the lower portion 72.

Additionally, a number of the ribs 102 and 104 toward the back 20b of the base assembly have channels (e.g., portions cut away) 114 disposed therein for allowing tubing to be disposed therethrough, as described in more detail below. The upper grid 100 corresponds to a lower grid 130. The grids 100 and 130 are engineered to reduce breakage of the upper portion 70 of the base assembly 20 upon impact with a foreign structure. Additionally, the designs of the grids 100 and 130 help to distribute the weight of the base assembly 20 in a manner that allows for the base assembly 20 to be moved through crop fields at reasonable speeds such as, for example, speeds ranging from about 1 mph to about 12 mph, while allowing the drop assembly 22 to hang in a reasonably vertical configuration. In embodiments, the weight of the base assembly 20 is distributed such that the base assembly is oriented with its front 20a end angled slightly upward (and thereby causing the drop assembly 22 to hang somewhat forward) while at rest, allowing the drop assembly 22 to move to a substantially vertical position as the speed of the carrier 12 increases and the carrier moves through the field.

Figure 13:
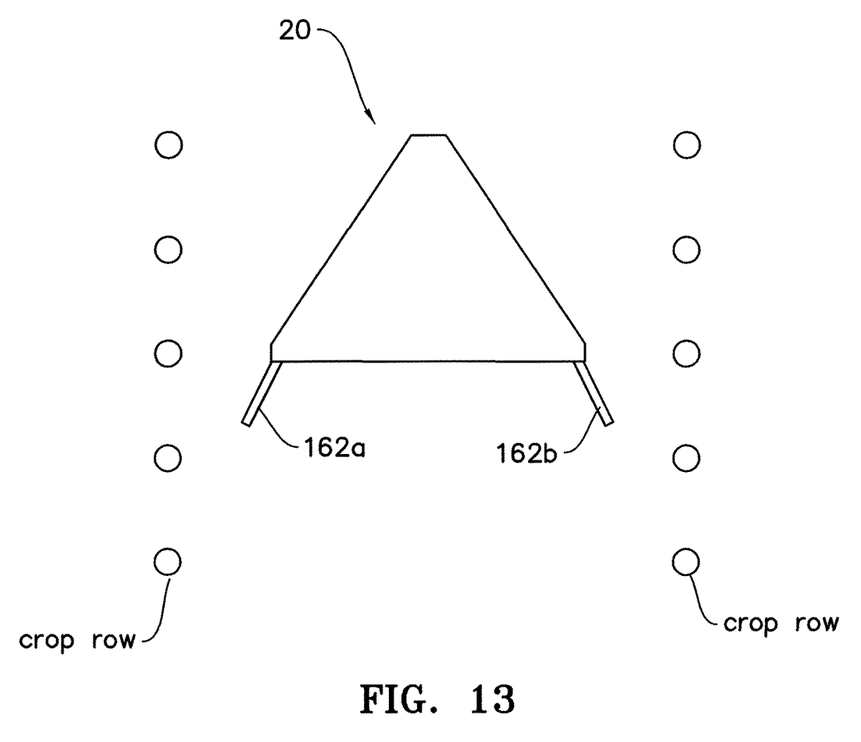
FIG. 13 is a top plan view of an embodiment of a base assembly positioned between adjacent crop rows.

According to various embodiments, the width 106a (FIG. 7A) of the back wall 76 of the upper portion 70 of the base assembly 20 can have any desired dimension. In embodiments, for example, the width 106a varies from about 9" to about 32". It will be appreciated by individuals having skill in the relevant arts that the length 108a of the mold varies in relation to the width 106. In some embodiments, the widths 106a and 106b (FIG. 8A) of the molds 70 and 72 are determined for a specific plant row width. According to various implementations, each base width 106a and 106b is designed to allow for 6" of total clearance, e.g., 3" of clearance on each side of the base assembly 20. As best illustrated in FIG. 13, this clearance between the base assembly 20 and the crop row allows the base assembly 20 to move between crop rows without damaging the crops in those crop rows.

With particular reference to FIG. 7C, the height 110 of the upper portion 70 of the base assembly 20 varies between the two sidewalls 80. As shown in FIG. 7C, the height 110 is beveled upward in the center front 111 of the upper portion 70 of the base assembly. The beveled upper portion 70 design allows neighboring base assemblies, when the machine is engaged, to not tangle with each other and allows base assemblies to slide off of each other if needed. Entanglement can happen, for example, when the boom 16 (or a portion thereof) is raised to allow the machine to turn at the end of a crop row. When the boom 16 is lowered, the standing crop may initially misalign the base assemblies until a short distance is traveled, whereby the design of the base assemblies allows the base assemblies to realign themselves. Additionally, the wing 92, which in embodiments, can extend approximately 1.5" from the back wall 76, protects neighboring base assemblies from catching on an elbow 160a or 160b (described in more detail below) when the base assemblies are realigned in the crop rows upon turnaround alignment from the row change.

Figure 8A:
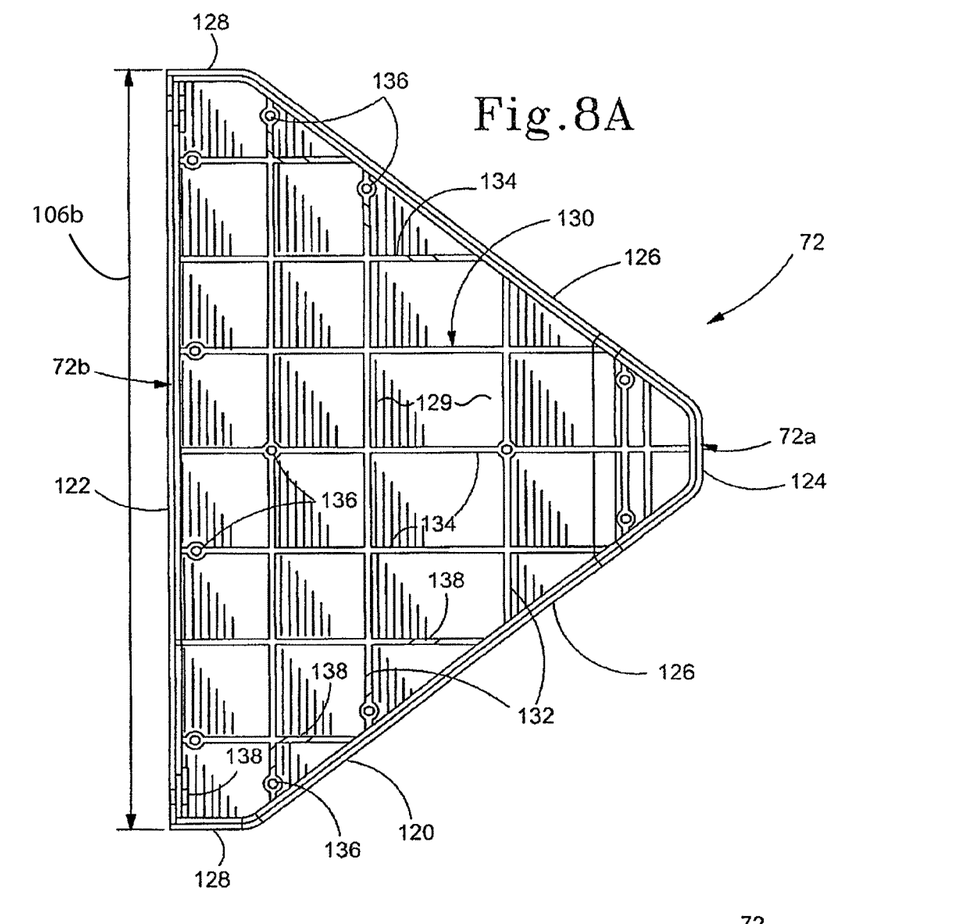
FIG. 8A is a top view of an illustrative lower portion of a base assembly in accordance with embodiments of the invention.
Figure 8B:
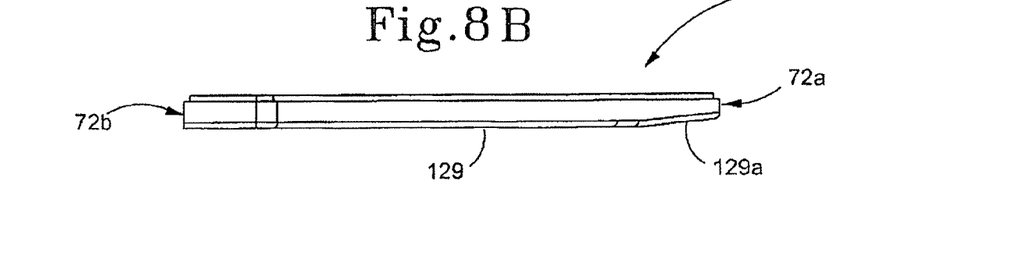
FIG. 8B is a side view of the illustrative lower portion of FIG. 8A in accordance with embodiments of the invention.

Turning now to FIGS. 5, 8A and 8B, the lower portion 72 of the base assembly 20 includes a frame 120 defined by a back wall 122, a front wall 124, two angled sidewalls 126, and two parallel wall segments 128, as shown. The shape of the frame 120 is roughly triangular and, in embodiments, is substantially similar to the shape of the frame 88 of the upper portion 70 of the base assembly 20. In some embodiments, the upper portion 70 and the lower portion 72 are configured such that the two portions 70 and 72 are flush along the sides when attached. A lower panel 129 extends over the bottom side of the frame 120. As shown in FIG. 8B, the lower panel 129 includes a bevel 129a extending from the front 72a of the lower portion 72 toward the rear 72b of the lower portion 72. In some embodiments, the bevel 129a can extend the entire length of the lower panel 129 (that is, the lower panel 129 itself could be angled downward from the front 72a toward the rear 72b), while in other embodiments (such as the embodiment illustrated in FIG. 8B), the bevel 129a extends for only a portion of the length of the lower panel 129. The bevel 129a helps the base assembly 20 move through crop rows more smoothly by facilitating deflection of encountered obstacles.

As is shown in FIG. 8A, the lower grid 130 is disposed within the frame 120 (and coupled to the lower panel 129). The lower grid 130 includes a first set of ribs 132 that extends between the two sidewalls 126 and a second set of ribs 134 that intersects the first set of ribs 132 in a substantially perpendicular orientation. As illustrated, each of the second set of ribs 134 extends between the back wall 122 and a sidewall 126. As shown in FIG. 8A, the lower portion 72 of the base assembly includes a number of apertures 136 that extend through ribs 132 or 134, thereby allowing the screws 73 to pass into the lower portion 72. Additionally, a number of the ribs 132 or 134 toward the back 20b of the base assembly have channels (e.g., portions cut away) 138 disposed therein. The channels 138 match the channels 114 of the upper portion 70 such that, when the base assembly 20 is assembled, a pair of throughways 140 (see FIG. 11, which illustrates one throughway 140 of the pair) are provided within the base assembly 20 for allowing tubing to be disposed therethrough, as described in more detail below.

Returning briefly to FIG. 1, a liquid product is delivered to crop rows, in embodiments of the invention, using a number of liquid placement apparatuses 18 that extend downwardly from a boom 16 attached to a carrier having a storage tank 15 and transfer pump (not illustrated herein for the purposes of clarity and brevity). The liquid product is pumped from the tank 15 into the distribution hose 19. The pump can be any type of conventional pump with the ability to provide enough liquid product as prescribed for the application intended.

Figures 6, 9A, 9B:
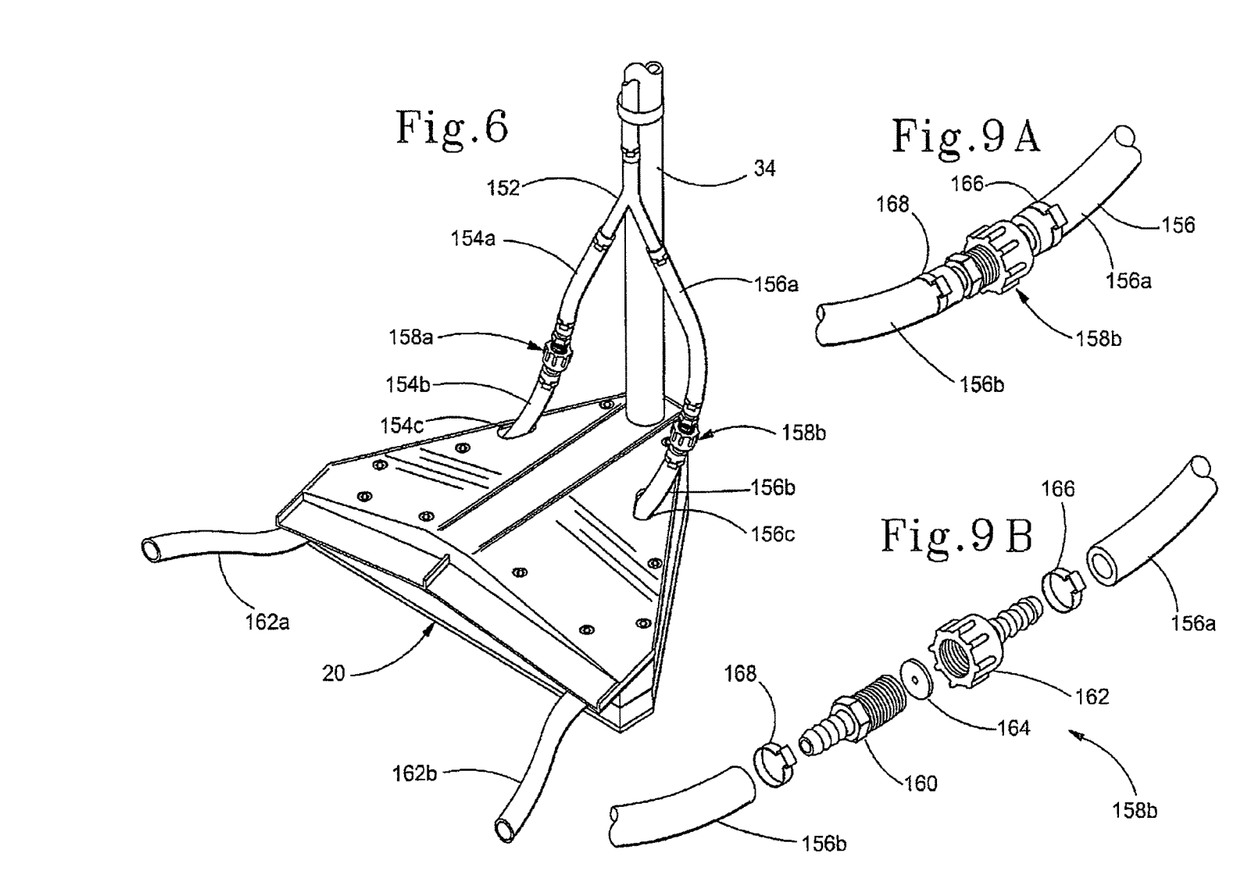
FIG. 6 is an assembled, perspective view of an illustrative base assembly in accordance with embodiments of the invention.
FIG. 9A is an assembled, perspective view of an illustrative flow regulator in accordance with embodiments of the invention.
FIG. 9B is an exploded, perspective view of the illustrative flow regulator of FIG. 9A in accordance with embodiments of the invention.

According to embodiments of the invention, and with reference to FIG. 2A, the liquid product travels through the distribution hose 19 and into the hose assembly 26 near the drop location 22a. As illustrated in FIGS. 2A, 5, and 6, the hose assembly 26 includes an upper hose assembly 142a that extends along the drop assembly 22 and that is attached, at an upper end 144 to an n-orifice outlet 146 using a connector 148 adapted to be relatively easily coupled to the n-orifice outlet 146. According to embodiments, the upper hose assembly 142a is a ⅝ diameter hose. In other embodiments, hoses of different diameters can be used to optimize liquid product flow for the particular configuration. At a lower end 150 of the upper hose assembly 142a, a y-splitter 152 couples the upper hose assembly 142a to a lower hose assembly 142b.

In embodiments, the upper hose assembly 142a is attached to the back of the drop assembly 22 using fasteners 142c, as shown in FIG. 2, to protect the upper hose assembly 142a form damage caused by encountering debris from the crop row. In embodiments, the upper hose assembly 142a is disposed outside of the drop assembly 22 for convenience of replacement. The fasteners 142c can include any type of fastening device such as clamps, ties, and the like. In other embodiments, the upper hose assembly 142a can be disposed within the drop assembly 22 for added protection. In further embodiments, a removable cover (not illustrated) can be disposed over the upper hose assembly 142a to protect the upper hose assembly 142a from damage.

Figure 12:
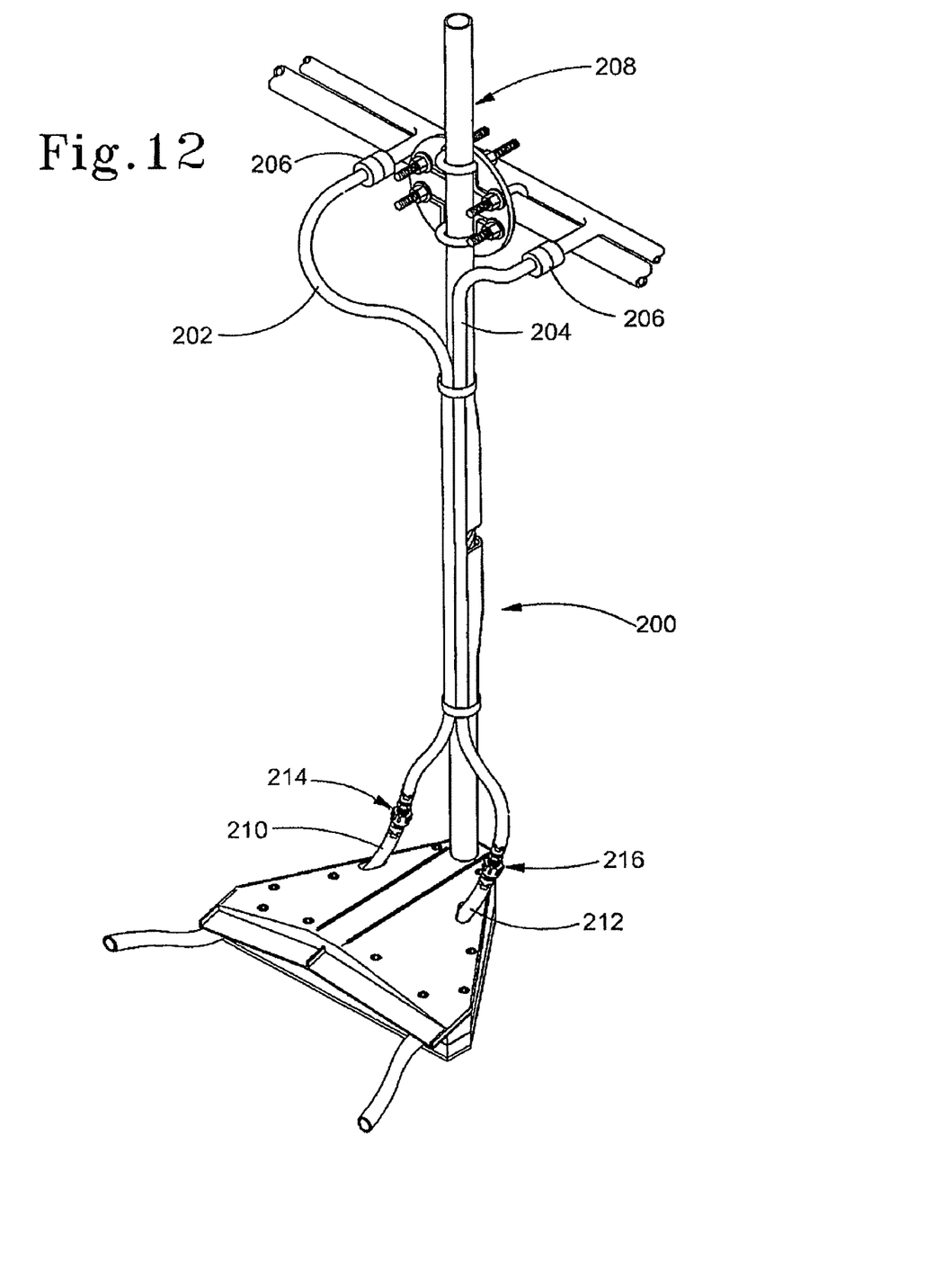
FIG. 12 is a perspective view of an alternative configuration for an illustrative liquid placement apparatus in accordance with embodiments of the invention.

Turning briefly to FIG. 12, an alternative embodiment of an upper hose assembly 200 is depicted. As shown in FIG. 12, the upper hose assembly 200 includes two hoses 202 and 204, each of which is coupled to an n-orifice outlet 206. This configuration can be useful, for example, where an operator wishes to use fewer liquid placement apparatuses 18 (see FIG. 1). As illustrated, the hoses 202 and 204 are disposed along the sides of the drop assembly 208 and are coupled to secondary hoses 210 and 212, respectively, using flow regulators 214 and 216, respectively. It should be understood that, in the embodiment illustrated in FIG. 12, a y-splitter is not needed, as the liquid product flow is delivered to the upper hose assembly 200 in two different channels 202 and 204 initially. In embodiments, a removable cover can be disposed over the upper hose assembly 200 to protect from damage caused by encountering debris in a crop row. Other configurations and implementations can be utilized, as well.

With reference to FIGS. 2A, 5, 6 and 9A and B, the lower hose assembly 142b includes a pair of secondary hoses 154 and 156, flow regulators 158a and 158b, (see FIG. 6) elbow assemblies 160a and 160b, and dribble hoses 162a and 162b. Each of the secondary hoses 154 and 156 includes a flow regulator 158a and 158b, respectively, disposed therein. The secondary hoses 154 and 156 are partially disposed within the base assembly 20, extending into the base assembly 20 through apertures 154c and 156c, respectively, which are defined within the upper panel 90 of the base assembly 20. Additionally, as shown in FIG. 5, within the base assembly 20, each of the secondary hoses 154 and 156 is coupled to an elbow assembly 160a and 160b, respectively. A dribble hose 162a and 162b is coupled to each elbow assembly 160a and 160b, respectively. In operation, the liquid product travels through the primary hose 142, through the y-splitter 152 into the secondary hoses 154 and 156, through the flow regulators 158a and 158b, into the elbow assemblies 160a and 160b and is ejected through the dribble hoses 162a and 162b.

Turning to FIGS. 9A and 9B, an illustrative flow regulator 158b is depicted. As shown, the flow regulator 158b is disposed within a secondary hose 156, which, as can be seen in FIGS. 9A and 9B, actually includes two separate hose portions 156a and 156b that are coupled by the flow regulator 158b. It should be understood that the other secondary hose 154 is similarly constructed (see, e.g., FIG. 6), having two hose portions 154a and 154b that are coupled using the flow regulator 158a. Additionally, the components and configuration of the flow regulator 158a, disposed within the secondary hose 154, are substantially the same as the components and configuration of the flow regulator 158b, described herein.

As shown in FIGS. 9A and 9B, the flow regulator 158b includes a flat orifice 164 enclosed inside of a plastic barbed insert 160 and cap 162. According to embodiments of the invention, the orifice 164 is strategically placed approximately 12.5" from the elbow apparatus 160b to ensure equal positive flow of liquid product. The size of the orifice 164 can be determined by desired flow rate, specific gravity of product, and volume of product to be delivered to a crop row. The flow regulator 158b is coupled to the hose portions 156a and 156b using clamps 166 and 168, respectively. According to embodiments of the invention, other types of flow regulators can be used.

Figure 10:
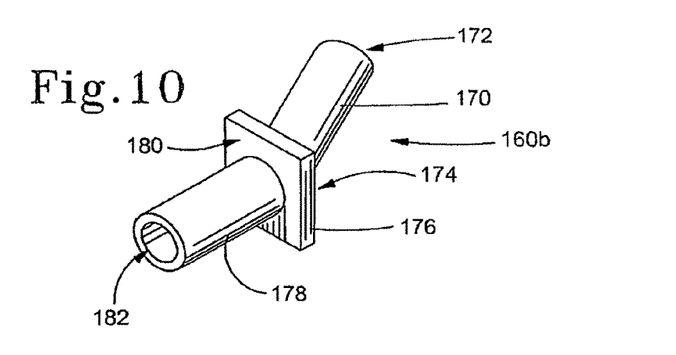
FIG. 10 is a perspective view of an illustrative elbow assembly in accordance with embodiments of the invention.
Figure 11:
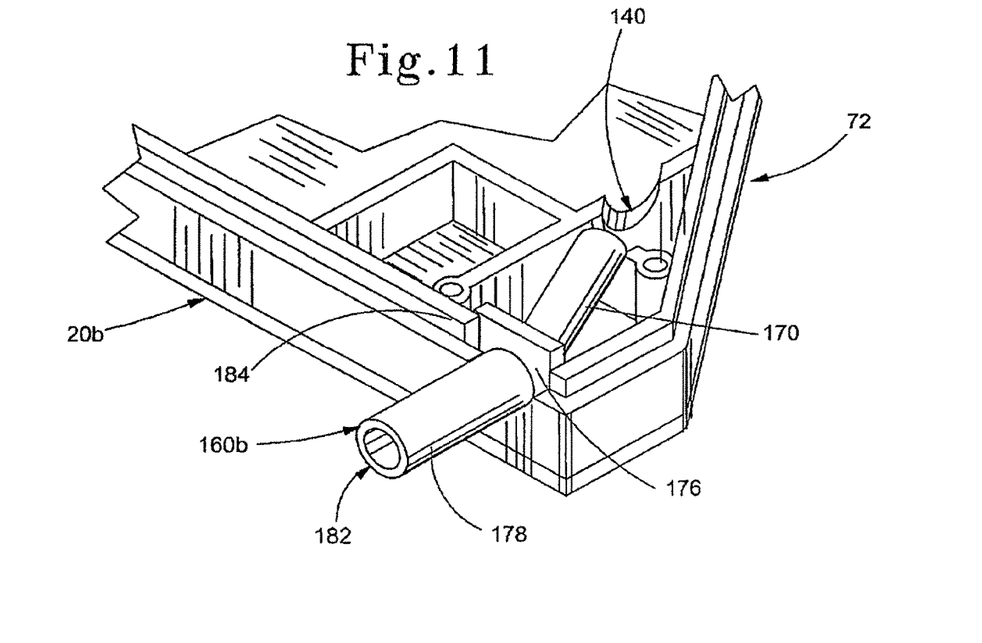
FIG. 11 is a partial, upper-perspective view of an illustrative lower portion of a base assembly, showing an elbow assembly disposed therein, in accordance with embodiments of the invention.

Turning now to FIGS. 10 and 11, and with continued reference to FIG. 5, the elbow assembly 160b includes a first portion 170 that is coupled, at a first end 172 thereof, to the secondary hose 158b and, at a second end 174 thereof to a mounting plate 176 having an opening (not shown) defined therein. The elbow assembly 160b further includes a second portion 178 that is coupled, at a first end 180 thereof, to the mounting plate 176, and, at a second end 182 thereof, to the dribble hose 162b. In embodiments, the components 170, 176, and 178 of the elbow assembly 160b can be stainless steel and can be welded together. A stainless steel construction minimizes the possibility of rust or other corrosive damage to the base assembly 20 from the liquid product. In other embodiments, other types of material and/or mechanisms for coupling the components 170, 176, and 178 can be employed. In embodiments, the second portion 178 of the elbow assembly 160b has a 3-5 degree turn away from the outside of the base assembly 20. According to some embodiments of the invention, the second portion 178 of the elbow assembly 160b also has a 22-degree bend downward to assist the flow of liquid product downward toward the ground to reduce splattering.

As shown in FIG. 11, the mounting plate 176 is configured to be disposed adjacent to a blocking surface 184 disposed within the lower portion 72 of the base assembly 20. The mounting plate 176, and its position adjacent the blocking surface 184, holds the elbow assembly 160b in place within the lower portion 72 of the base assembly 20. The second hose portion 162b of the secondary hose 162, and the first portion 170 and the second portion 178 of the elbow assembly 160b are configured to be disposed within the throughway 140 defined within the base assembly 20. It should be understood that a substantially similar configuration is repeated on the other side of the base assembly with respect to the secondary hose 154 and the corresponding elbow assembly 160a.

Returning briefly to FIG. 5, the dribble hoses 162a and 162b are attached to the elbow assemblies 160a and 160b using clamps 185a and 185b, respectively, and can include, for example, hoses with single-strand wire enclosures of lengths varying from about 18" to about 36," depending on the application. According to embodiments, the dribble hoses 162a and 162b are configured to drag on the ground as the carrier 12 (see FIG. 1) moves through a field of row crops. In other embodiments, the dribble hoses 162a and 162b are configured to terminate some predetermined distance above the ground. Additionally, in various embodiments, the dribble hoses 162a and 162b are attached to the elbow assemblies 160a and 160b, respectively, using an adjustable clamp, which facilitates relatively easy assembly and replacement.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

The invention claimed is:

1. In a field with crops growing in adjacently spaced crop rows, a self-aligning liquid applicator for delivering liquid fertilizer over the moisture zone of the adjacently spaced row crops, the self-aligning liquid applicator comprising:
a plurality of dispensing units supported above a soil surface by a vertical support extending downwardly from a boom structure, the plurality of dispensing units spaced laterally along the boom structure such that each of the plurality of dispensing units is received between the adjacently spaced crop rows, each of the plurality of dispensing units having throughways diverging laterally outward from a forward end toward a rearward end, the forward end oriented toward a forward direction of travel, the rearward end extending rearward from the forward end, the rearward end having a lateral width greater than a lateral width of the forward end, each of the throughways having an associated dribble hose, a supply hose communicating liquid fertilizer from a liquid fertilizer source to the dribble hoses, the supply hose extending at least partially through each of the throughways;
whereby, as the liquid applicator advances in the forward direction of travel, each of the plurality of dispensing units is maintained between the adjacently spaced crop rows with the forward end remaining oriented in the forward direction of travel, such that an outlet end of each of the dribble hoses delivers the liquid fertilizer outwardly and rearwardly of the forward end and over the moisture zone of the adjacently spaced crop rows.

2. The self-aligning liquid applicator of claim 1 further including a carrier.

3. The self-aligning liquid applicator of claim 2 wherein the boom structure is supported by the carrier, the boom structure extending laterally in a direction transverse to the crop rows, the boom structure selectively vertically adjustable relative to a height of the row crop or a height above a soil surface.

4. The self-aligning liquid applicator of claim 2, wherein the carrier is self-propelled.

5. The self-aligning liquid applicator of claim 2, wherein the carrier is towed.

6. The self-aligning liquid applicator of claim 2, wherein the carrier is a tractor.

7. The self-aligning liquid applicator of claim 1, wherein each of the plurality of dispensing units includes a rigid base, the rigid base including structure between the throughways.

8. The self-aligning liquid applicator of claim 1, wherein the dribble hoses are coupled to an outlet end of the throughways.

9. The self-aligning liquid applicator of claim 1, wherein the dribble hoses extend at least partially through each of the throughways.

10. The self-aligning liquid applicator of claim 7, wherein the rigid base comprises a top member and a bottom member, the top member and bottom member defining the throughways.

11. The self-aligning liquid applicator of claim 1, wherein the vertical support comprise a rigid lower portion flexibly coupled to an upper portion, such that the rigid lower portion is capable of deflecting with respect to the upper portion.

12. The self-aligning liquid applicator of claim 1, wherein the vertical support comprise a rigid lower portion flexibly coupled to a rigid upper portion, such that the rigid lower portion is capable of deflecting with respect to the rigid upper portion.

* * * * *